(12) United States Patent
O'Konek et al.

(10) Patent No.: US 12,498,750 B2
(45) Date of Patent: Dec. 16, 2025

(54) JOYSTICK

(71) Applicant: Nott Company, Arden Hills, MN (US)

(72) Inventors: Dusten Carl O'Konek, Henderson, MN (US); Justin D. York, Apple Valley, MN (US)

(73) Assignee: Nott Company, Arden Hills, MN (US)

( * ) Notice: Subject to any disclaimer, the term of this patent is extended or adjusted under 35 U.S.C. 154(b) by 0 days.

(21) Appl. No.: 18/480,270

(22) Filed: Oct. 3, 2023

(65) Prior Publication Data

US 2025/0110523 A1     Apr. 3, 2025

(51) Int. Cl.
*G05G 9/047*     (2006.01)

(52) U.S. Cl.
CPC ... *G05G 9/047* (2013.01); *G05G 2009/04748* (2013.01)

(58) Field of Classification Search
CPC ..... G05G 9/04785; G05G 2009/04774; G05G 9/047; G05G 2009/04748
See application file for complete search history.

(56) References Cited

U.S. PATENT DOCUMENTS

| | | | | |
|---|---|---|---|---|
| 6,068,554 A | * | 5/2000 | Tyler | G05G 9/047 345/161 |
| 8,151,928 B2 | * | 4/2012 | States | G01D 5/145 200/557 |
| 10,198,086 B2 | * | 2/2019 | Parazynski | G06F 3/0346 |
| 11,114,267 B2 | * | 9/2021 | Paquette | G05G 9/047 |
| 2010/0195279 A1 | * | 8/2010 | Michael | G06F 1/1632 361/679.41 |

* cited by examiner

*Primary Examiner* — Gregory Robert Weber
(74) *Attorney, Agent, or Firm* — Ballard Spahr LLP

(57) ABSTRACT

A system includes a joystick having a body defining a handle. At least one socket is operably coupled to the handle. The joystick further includes one or more sensors including: an orientation sensor that is configured to sense orientation of the handle or an input device. Each sensor is operably coupled to the at least one socket.

19 Claims, 5 Drawing Sheets

JOYSTICK

FIELD

This disclosure relates to joysticks that are configured to receive at least one removable controller.

BACKGROUND

Joysticks can be used for controlling various equipment. Typically, the processing associated with the joystick is provided by a processor that is remote to the joystick so that the joystick merely provides signals to the remote processor. Other conventional joysticks include an integral processor that contains a program typically dedicated to communication and not control logic. As such, these joysticks offer little to no adaptability for different applications.

SUMMARY

Disclosed herein is a system including a joystick having a body defining a handle. At least one socket is operably coupled to the handle. The joystick further includes one or more sensors including: an orientation sensor that is configured to sense orientation of the handle or an input device. Each sensor is operably coupled to the at least one socket.

The system can further include a first processing unit configured to be electrically coupled to, and removable from, the at least one socket. The processing unit can include a controller, the controller having a processor and a communications module, and a fitting that is receivable into the first socket. Upon operable connection of the fitting into the first socket, the processor of the first processing unit can be in electrical communication with each sensor.

Methods of using the system are also disclosed.

Also disclosed herein is a vehicle including a system having a joystick and a steering mechanism, a power train, or an auxiliary function device. At least one of the steering mechanism, the power train, or the auxiliary function device is in communication with the controller of the first processing unit such that movement of the joystick or operation of the at least one input device effects movement of a position of the vehicle or operation of the auxiliary function device of the vehicle.

Also disclosed herein is a piece of equipment including a system having a joystick and a primary controller of the piece of equipment in electrical communication with the first processing unit such that movement of the joystick or operation of the at least one input device effects movement of a position of the piece of equipment or an auxiliary function of the piece of equipment.

In another aspect, a kit includes a joystick having a body defining a handle. At least a first socket can be operably coupled to the handle. The joystick can further include at least one sensor. The at least one sensor can include at least one orientation sensor that is configured to sense orientation of the handle; or at least input device. Each sensor of at least one sensor can be operably coupled to the at least one socket. The kit can further include a plurality of processing units that are configured to electrically couple to the at least one socket. Each processing unit of the plurality of processing units can include a controller having a processor and a communications module. Each processing unit can further include a fitting that is receivable into the first socket. Upon connection of receipt of each processing unit into the first socket, the processor of the said processing unit is in electrical communication with each sensor of the plurality of sensors.

Additional advantages of the disclosed apparatuses, systems, and methods will be set forth in part in the description that follows, and in part will be obvious from the description, or may be learned by practice of the claimed invention. The advantages of the disclosed devices and systems will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Figure 1:
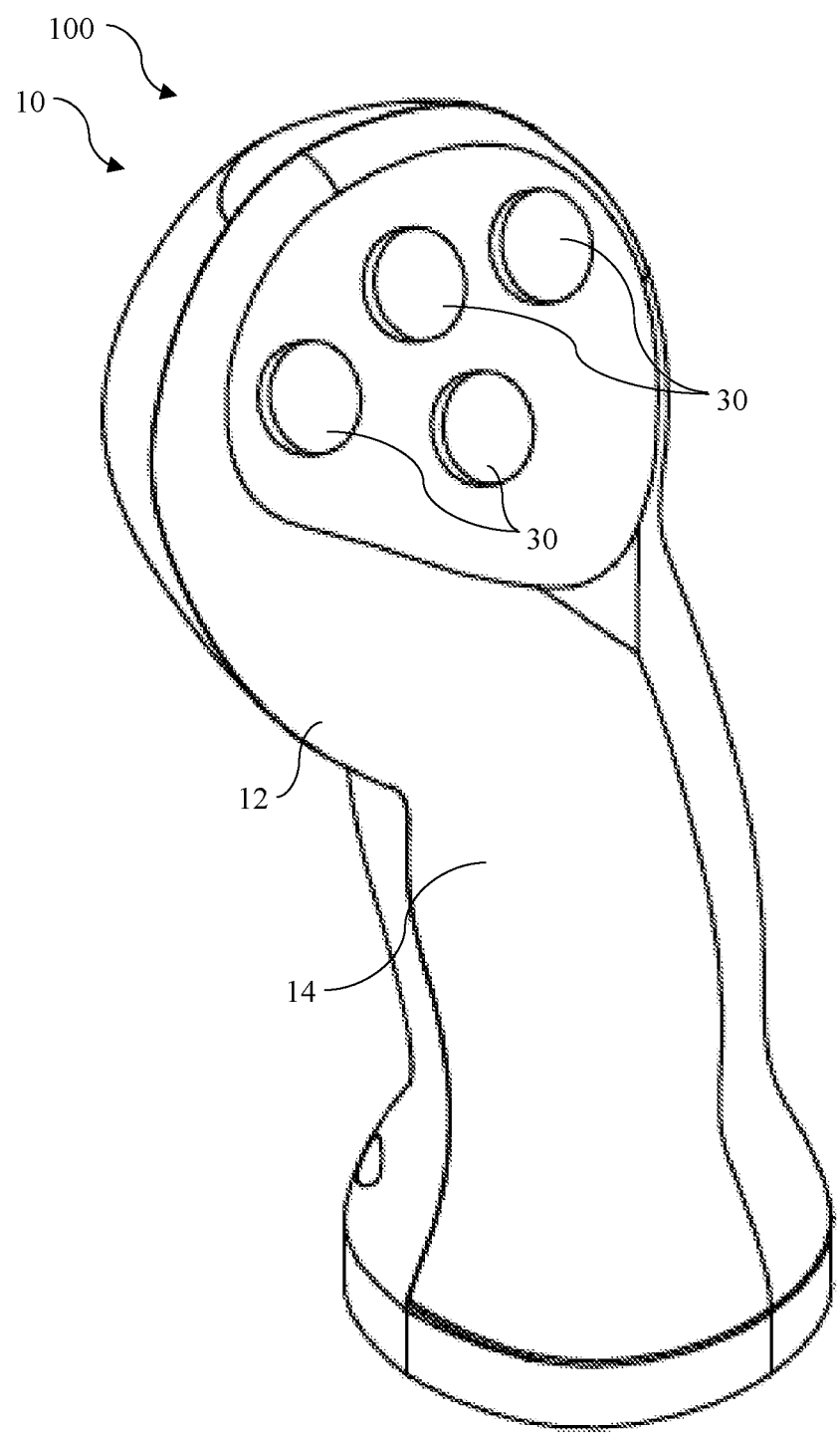
FIG. 1 is a perspective view of an exemplary system comprising a joystick as disclosed herein.
Figure 2:
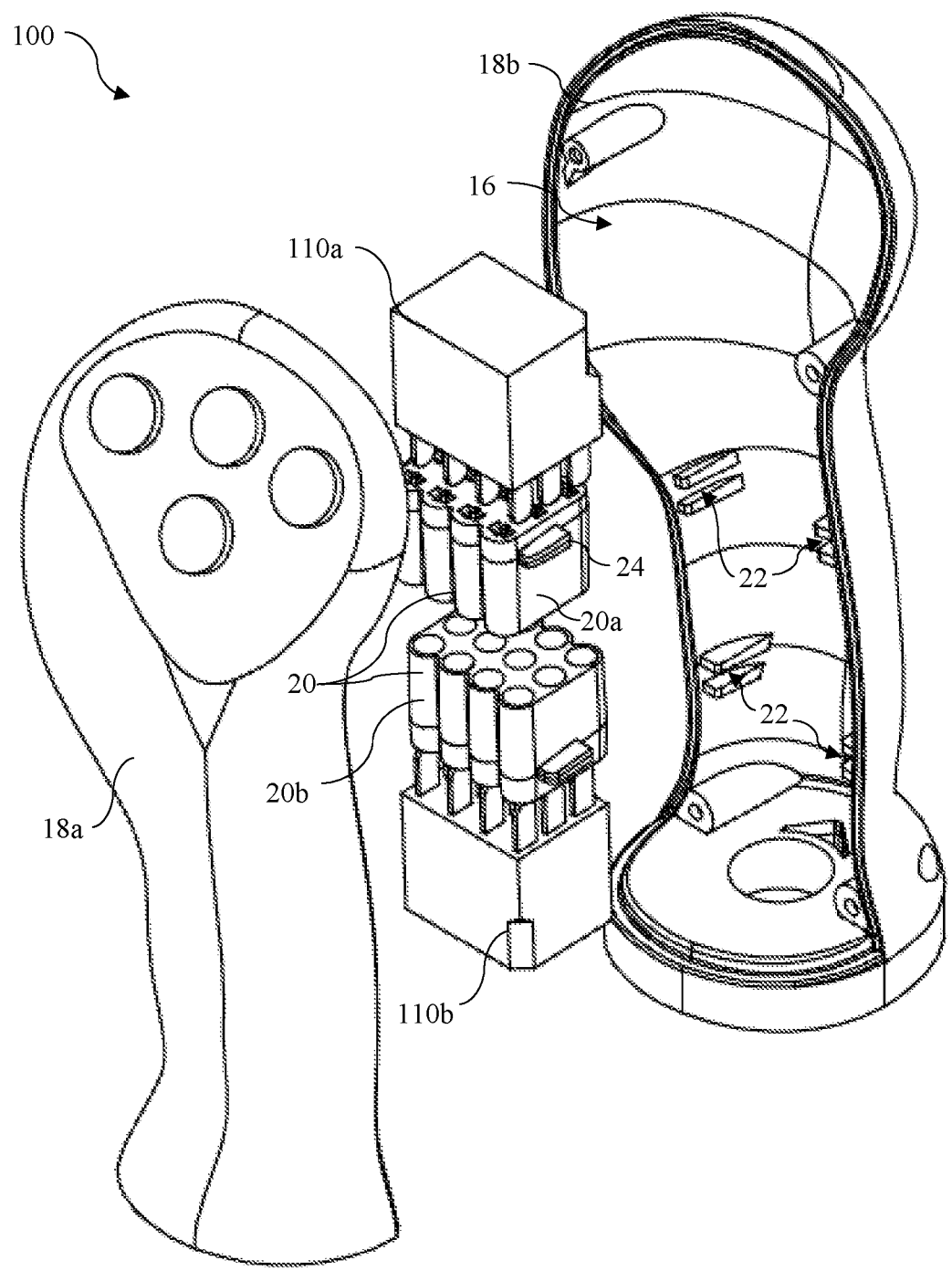
FIG. 2 is an exploded view of the exemplary system comprising a joystick as in FIG. 1.
Figure 3:
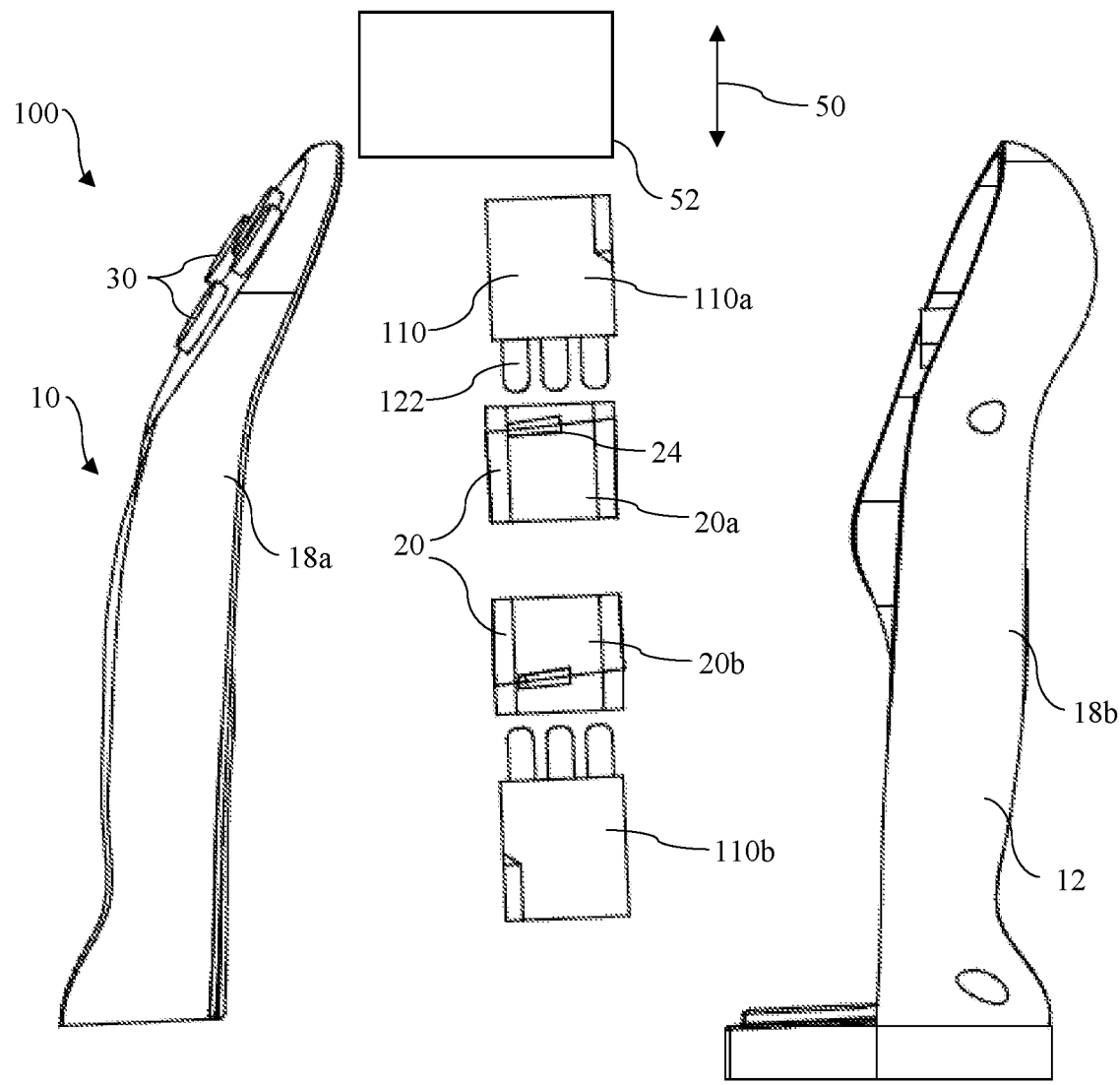
FIG. 3 is another exploded view of the exemplary system comprising a joystick as in FIG. 1.
Figure 4:
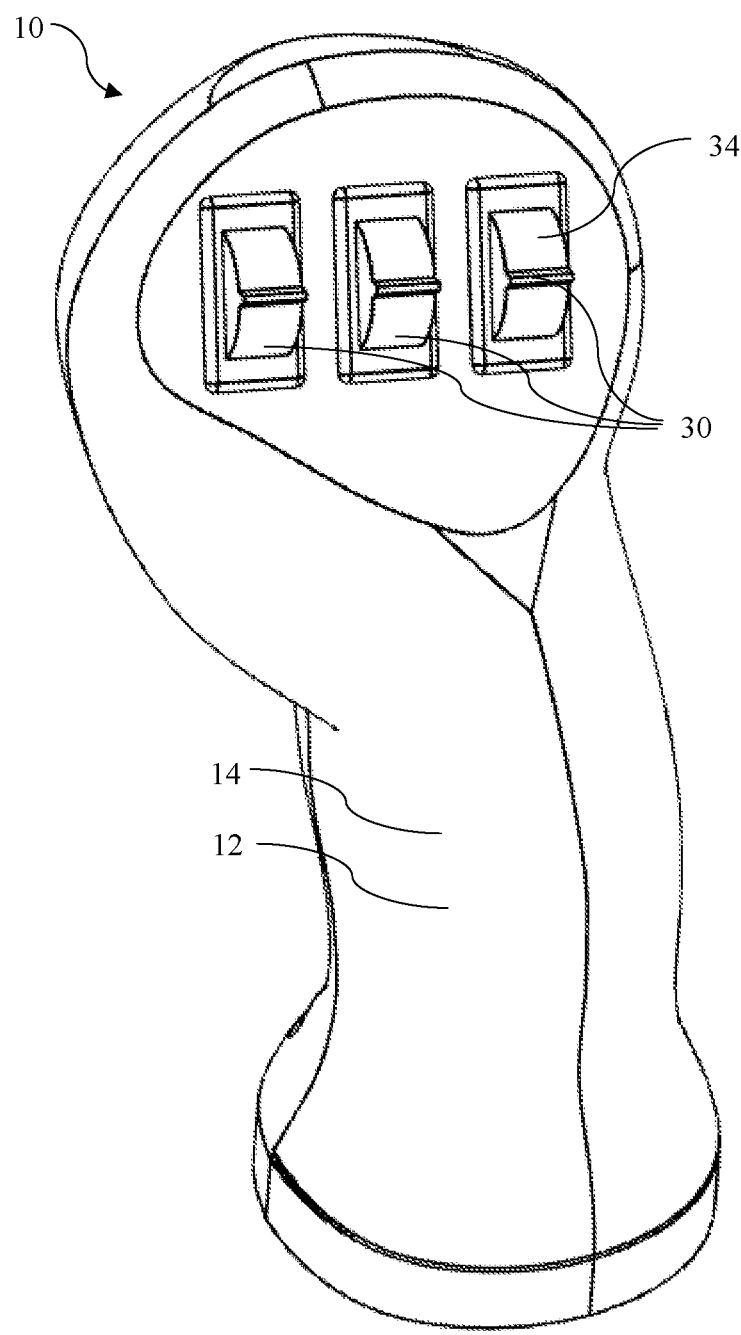
FIG. 4 is a perspective view of an exemplary system comprising a joystick as disclosed herein.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein represents disclosure of embodiments in which any one member of a particular list is provided, and, unless context dictates otherwise, also represents disclosure of alternative embodiments in which any combination of members of that list is provided.

It must be noted that as used herein and in the appended claims, the singular forms "a," "an," and "the" can include both single and plural references unless the context clearly dictates otherwise. Thus, for example, unless the context dictates otherwise, reference to "an input device" includes aspects in which only one input device is provided, as well as aspects in which a plurality of such input devices are provided.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

Disclosed herein, and with reference to FIGS. 1-4, is a joystick 10 comprising a body 12 defining a handle 14. At least one socket 20 can be operably coupled to the handle 14. For example a first socket 20a can be coupled to the handle 14. In further optional aspects, a second socket 20b can be coupled to the handle 14. In still further aspects, three or more sockets 20 can be operably coupled to the handle 14. The joystick 10 can further comprise at least one sensor 30 that is configured to receive user input. In some aspects, the at least one sensor 30 can comprise at least one orientation sensor 32 that is configured to sense orientation of the handle 14. In further or alternative aspects, the at least one sensor 30 can comprise at least input device 34. In some aspects, each sensor 30 of at least one sensor can be operably coupled to the at least one socket 20.

In some aspects, the joystick 10 can comprise a plurality of sockets 20. Optionally, in these aspects, the handle 10 can have a longitudinal axis 8, with the plurality of sockets 20 being spaced along the longitudinal axis.

In various aspects, the socket(s) 20 can be positioned within the body 12. For example, the body 12 can enclose an interior 16, and the socket(s) 20 can be received within the interior 16. In some optional aspects, the socket(s) 20 can be removable from the interior 16 of the body 12. For example, the body 12 can define at least one slot 22 (e.g., opposed slots 22) that receive protrusions 24 extending outwardly from the sockets 20 to receive the protrusions. In this way, the socket(s) 20 can be slidingly received into the body 12. In further aspects, any combination of slots, detents, latches, hooks, or fasteners can be used to secure the sockets within the body 12. In some aspects, the socket(s) 20 can be coupled to the sensors 30 via one or more wires or other electrical connection (not shown).

In some aspects, the body 12 can comprise a plurality of separable components. For example, the body 12 can comprise a first component 18a and a second component 18b. Optionally, the first and second components 18a,b can be positioned along opposite sides along a transverse axis. For example, the first component 18a can form a front portion of the handle 14, and the second component 18b can form a rear portion of the handle 14. In other aspects, the first component 18a can form a left side portion of the handle 14, and the second component 18b can form a right side portion of the handle 14. In other aspects, the second component 18b can be a cover (e.g., a small cover) that cooperates with the first component 18a to enclose a single socket 20 or a plurality of sockets 20 (e.g., the first socket 20a and a second socket 20b). In some aspects, one or more fasteners can secure the first and second components 18a,b together. In further aspects, one or more detents, latches, hooks, fasteners, or a combination thereof can secure the first and second components 18a,b together.

The handle 14 can be ergonomically configured to engage the hand of the user. In some aspects, the handle 14 can be asymmetric in order to ergonomically engage a particular hand (e.g., a left hand or a right hand) of the user. In some aspects, the joystick can have a construction that is a mirror image of the illustrated embodiments in order to accommodate usage of the joystick by the opposite hand. For example, FIGS. 1-4 depict a joystick that can be configured for usage by a right hand, and it is contemplated that a second joystick having a mirror image construction can be configured for usage by a left hand.

In some aspects, the at least one input device 34 of the joystick 10 can comprise one or more of: at least one momentary button, at least one detented button, at least one micro joystick, at least one thumbwheel, at least one slide switch, at least one toggle switch, at least one potentiometer, at least one hall-effect input, or at least one inductive sensor.

In some aspects, the joystick 10 can further comprise a base 40 coupled to the handle 14. In these aspects, the joystick 10 can comprise a first orientation sensor 32a that is configured to sense angular position of the handle 14 relative to the base 40 in a first plane 50 and a second orientation sensor 32b that is configured to sense angular position of the handle 14 relative to the base 40 in a second plane 52 that is perpendicular to the first plane. Such orientation sensors can include, for example, Hall effect sensors. In other aspects, a single sensor can be configured to sense angular position of the handle 14 relative to the base in the first and second planes 50, 52.

Figure 5:
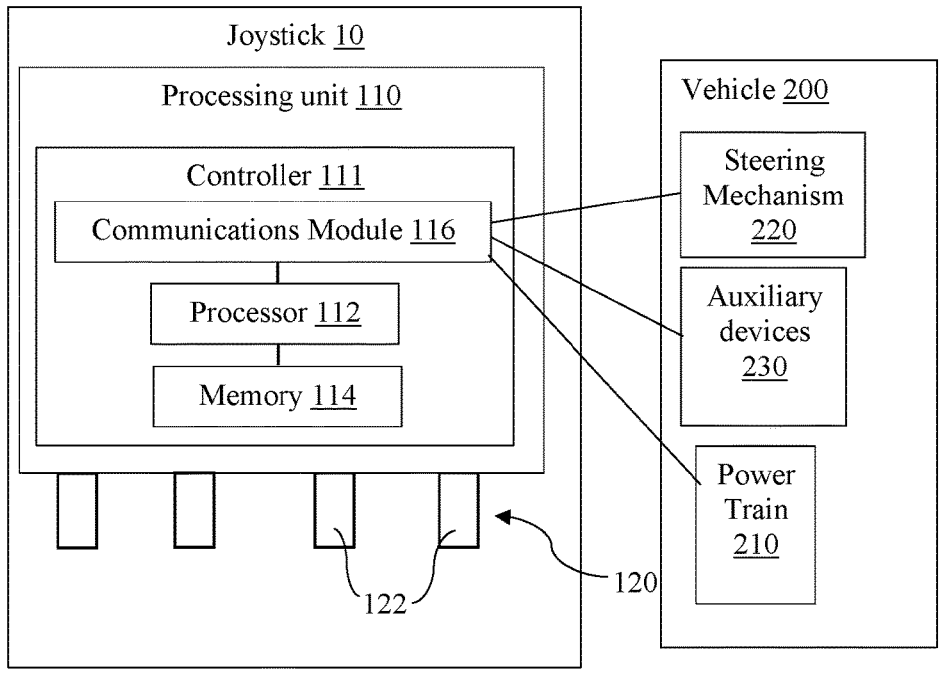
FIG. 5 is a schematic diagram of a vehicle with a system comprising a joystick as disclosed herein.

In some aspects, a system 100 can comprise a joystick 10 and at least one processing unit 110 (including a first processing unit 110a) configured to be electrically coupled to, and removable from, the first socket 20a. Referring also to FIG. 5, each processing unit 110 can comprise a controller 111 comprising a processor 112 (or a plurality of processors) and memory 114 in communication with the processor (or plurality of processors). The controller 111 can further comprise a communications module 116 in communication with the processor 112. The communications module 116 can comprise one or more inputs and/or one or more outputs. For example, the input(s) can receive signals, and the output(s) can transmit signals. The processing unit 110 can further comprise a fitting 120 that is receivable into the first socket 20a or, in further aspects, each socket 20. Upon operable connection of the fitting of the first processing unit 110a into the first socket 20a, the processor 112 of the first processing unit can be in electrical communication with each sensor 30.

The fitting 120 can comprise a plurality of pins 122 that are receivable into the socket. In some aspects, the plurality of pins 122 can be arranged according to ISO 280 specifications. For example, the plurality of pins 122 can comprise twelve pins arranged in three rows and four columns. However, further pin configuration are contemplated.

In some aspects, the system 100 can comprise a second processing unit 110b. In some aspects, the second processing unit 110b can be configured to be electrically coupled to, and removable from, the second socket 20b.

In some aspects, the joystick 10 can be free of a processor. Thus, the only processor(s) within the joystick 10 can be the processors 112 of the removable processing unit(s) 110.

The joystick 10 can be elongate along a longitudinal axis 4. Optionally, the processing unit 110 can be receivable into the socket along the longitudinal axis 4. More generally, the socket(s) 20 can face in any suitable direction. For example, the first socket 20a can define openings that receive the fitting of the first processing unit 100a in a downward direction. In further aspects, the second socket 20a can define openings that receive the fitting of the second processing unit 110b in an upward direction.

In some optional aspects, a respective processing unit 100 can be received within each socket of the plurality of sockets 20. Thus, in some aspects, a plurality of processing units 100 can be provided. In some aspects, each processing unit 100 can be configured to interface with different portions of a piece of equipment, as further described herein. In further aspects, each processing unit 100 can be associated with various inputs and/or outputs. It is contemplated that use of multiple processing units can provide a modular, adaptable system that can easily interface with various pieces of equipment, such as machinery or vehicles. Further, using multiple processing units 100 can expand processing capacity as well as provide more inputs and outputs in order to enable increased functionality.

The joystick 10 can be configured for use with a piece of equipment. The piece of equipment can be, for example, an on-highway vehicle, a sanitation vehicle, a marine vehicle, maintenance equipment, construction equipment, forestry equipment, or industrial manufacturing equipment. In some aspects, the joystick 10 can be is coupled to a piece of equipment. In other aspects, the joystick 10 can be remote from the piece of equipment.

Figure 6:
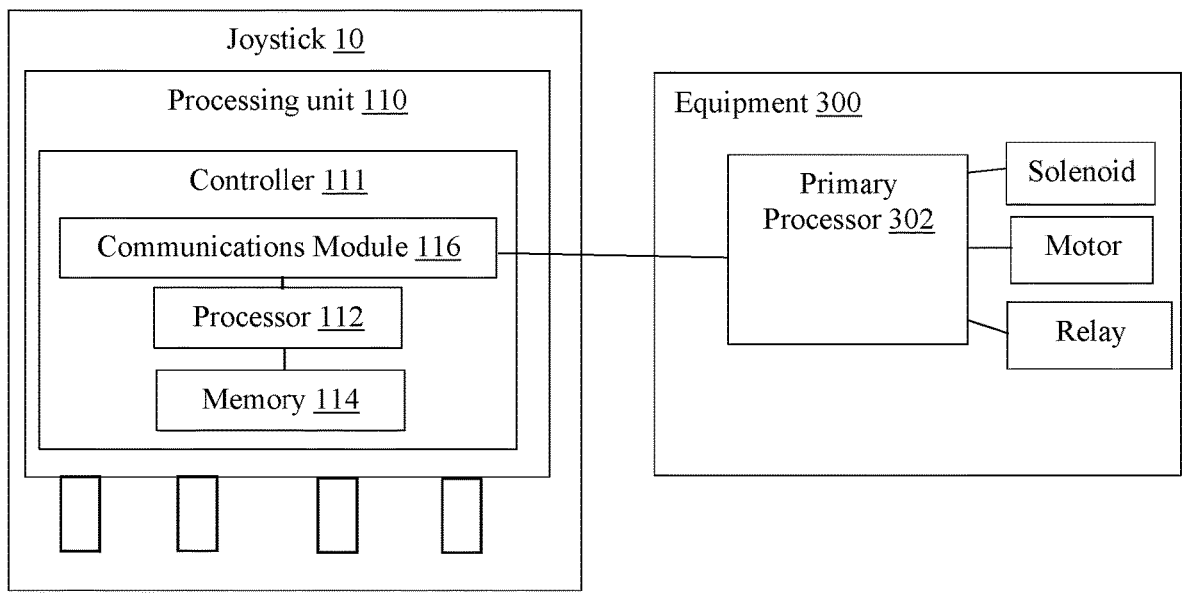
FIG. 6 is schematic diagram of a vehicle with a system comprising a joystick as disclosed herein.

In some aspects, the first processing unit 110a can be in communication with the piece of equipment. For example, the with the first processing unit 110a being positioned within the first socket 20a, the input(s) and/or output(s) of the communications module 116 of the first processing unit 110a can be in communication with one or more elements of the machinery. In some aspects, the first processing unit 110a can communicate with a primary processor 302 (FIG. 6) of the machinery. Thus, the joystick 10 can effect operation of the equipment by operation through the primary processor 302. In other aspects, the first processing unit 110a can be in direct communication with one or more components of the piece of equipment. For example, the output(s) of the communications module 116 of the first processing unit 110a can provide signals directly to one or more of a motor, a pneumatic device, a hydraulic device, a valve, a relay, or any other component of the piece of equipment for effecting operation of or receiving signals therefrom.

In some aspects, the joystick can further comprise at least one visual indicator or at least one lighting device. For example, the joystick 10 can comprise one or more LEDs. In further aspects, the joystick 10 can comprise an LED array or an LCD, TFT (thin-film-transistor), OLED (organic light-emitting diode) or other suitable display. The one or more LEDs or other visual indicator(s) or lighting device(s) can be in operative communication with the socket(s) so that operation of the one or more LEDs or other visual indicator(s) or lighting device(s) can be controlled by a processing unit 110 in the socket(s) 20.

A vehicle 200 can comprise a joystick 10 as disclosed herein and at least a first processing unit 110a received within the first socket 20a of the joystick. The controller 111 of the first processing unit 110a can be in communication with the vehicle 200 such that movement of the joystick or operation of the at least one input device 34 effects movement of a position of the vehicle or an auxiliary function an auxiliary device 230 of the vehicle. For example, the vehicle 200 can comprise a power train 210, and the joystick 10 can be configured, via the first processing unit 110a, to operate at least one aspect of the power train 210. As another example, the vehicle 200 can comprise a steering mechanism 220, and the joystick can be configured, via the first processing unit 110a, to operate at least one aspect of the steering mechanism 220. In some aspects, the vehicle can be an on-highway vehicle, a sanitation vehicle, or a marine vehicle.

A piece of equipment 300 can comprise a joystick 10 as disclosed herein and at least a first processing unit 110a received within the first socket 20a of the joystick. The piece of equipment 300 can further comprise a primary controller in electrical communication with the controller(s) such that movement of the joystick or operation of the at least one input device effects movement of a position of the piece of equipment or an auxiliary function of the piece of equipment.

In some aspects, the controller 111 of the processing unit 110 can be in electrical communication with a display 400 such that movement of the joystick effects movement of an object depicted on the display. The depicted object can be, for example, a vehicle or a piece of machinery or a portion thereof.

A method of using the system 100 can comprise inserting a first processing unit 110a into the first socket 20a of the joystick 10. In some optional aspects, a second processing unit 110b can be inserted into the second socket 20b of the joystick 10. The joystick 10 can be used to effect movement of, or other operation of, a piece of equipment electrically coupled to the controller of the first processing unit 110a.

In some aspects, the first processing unit 110a from the first socket 20a and a second processing unit 110b can be inserted into the first socket 20a. In this way, the system 10 can be adapted for different operations or use.

A kit can comprise a joystick 10 as disclosed herein. The kit can further comprise a plurality of processing units that are configured to electrically couple to the at least one socket. Each processing unit of the plurality of processing units can comprise a controller 111 comprising a processor 112 and memory 114 in communication with the processor. The controller 111 can further comprise a communications module 116. The communications module 116 can comprise one or more inputs and/or one or more outputs. For example, the input(s) can receive signals, and the output(s) can transmit signals. The processing unit 110 can further comprise a fitting 120 that is receivable into the first socket 20a or, in further aspects, each socket 20. Upon operable connection of the fitting of the first processing unit 110a into the first socket 20a, the processor 112 of the first processing unit can be in electrical communication with each sensor 30.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system comprising:
a joystick comprising:
  a body defining a handle;
  at least one socket operably coupled to the handle, the at least one socket comprising a first socket; and
  at least one sensor comprising:
    at least one orientation sensor that is configured to sense orientation of the handle; or
    at least input device;
  wherein each sensor of at least one sensor is operably coupled to the at least one socket.

Aspect 2: The system of aspect 1, further comprising a first processing unit configured to be electrically coupled to, and removable from, the first socket, wherein the processing unit comprises:
a controller comprising:
  a processor; and
  a communications module;
a fitting that is receivable into the first socket,
wherein, upon operable connection of the fitting into the first socket, the processor of the first processing unit is in electrical communication with each sensor.

Aspect 3: The system of aspect 2, wherein the fitting comprises a plurality of pins that are receivable into the socket.

Aspect 4: The system of aspect 3, wherein the plurality of pins are arranged according to ISO 280 specifications.

Aspect 5: The system of aspect 3 or aspect 4, wherein the plurality of pins comprise twelve pins arranged in a three rows and four columns.

Aspect 6: The system of any one of the preceding aspects, wherein the joystick is free of a processor.

Aspect 7: The system of any one of aspects 2-6, wherein the joystick is elongate along a longitudinal axis, and wherein the processing unit is receivable into the socket along the longitudinal axis.

Aspect 8: The system of any one of the preceding aspects, wherein the handle defines an interior space, wherein the at least one socket is positioned within the interior space.

Aspect 9: The system of any one of the preceding aspects, wherein the joystick is elongate along a longitudinal axis, and wherein the handle comprises two oppositely facing sections that extend along the longitudinal axis.

Aspect 10: The system of any one of the preceding aspects, wherein the joystick further comprises a base coupled to the handle, wherein the at least one orientation sensor configured to sense orientation of the handle comprises:
a first orientation sensor that is configured to sense angular position of the handle relative to the base in a first plane; and
a second orientation sensor that is configured to sense angular position of the handle relative to the base in a second plane that is perpendicular to the first plane.

Aspect 11: The system of any one of the preceding aspects, wherein the joystick comprises a plurality of sockets operably coupled to the handle.

Aspect 12: The system of aspect 11 further comprising a respective processing unit received within each socket of the plurality of sockets.

Aspect 13: The system of aspect 11 or aspect 12, wherein the joystick is elongate along a longitudinal axis, wherein the plurality of sockets are spaced along the longitudinal axis.

Aspect 14: The system of any one of the preceding aspects, wherein the joystick is operably coupled to a piece of equipment.

Aspect 15: The system of aspect 14, wherein the piece of equipment is one of: an on-highway vehicle, a sanitation vehicle, a marine vehicle, maintenance equipment, construction equipment, forestry equipment, or industrial manufacturing equipment.

Aspect 16: The system of any one of the preceding aspects, wherein the at least one input device of the joystick comprises at least one momentary button, at least one detented button, at least one micro joystick, at least one thumbwheel, at least one slide switch, at least one toggle switch, at least one potentiometer, at least one hall-effect input, or at least one inductive sensor.

Aspect 17: The system of any one of the preceding aspects, wherein the joystick further comprises at least one visual indicator or at least one lighting device.

Aspect 18: The system of any one of aspects 2-17, wherein the controller is in electrical communication with a display.

Aspect 19: A vehicle comprising:
a system of any one of aspects 2-17; and
a steering mechanism, a power train, or an auxiliary function device;
wherein at least one of the steering mechanism, the power train, or the auxiliary function device is in communication with the controller of the first processing unit such that movement of the joystick or operation of the at least one input device effects movement of a position of the vehicle or operation of the auxiliary function device of the vehicle.

Aspect 20: A piece of equipment comprising:
a system of any one of aspects 2-17; and
a primary controller of the piece of equipment in electrical communication with the first processing unit such that movement of the joystick or operation of the at least one input device effects movement of a position of the piece of equipment or an auxiliary function of the piece of equipment.

Aspect 21: A method of using the system of any one of the preceding aspects, the method comprising:
inserting a first processing unit into the first socket of the joystick.

Aspect 22: The method of aspect 21, further comprising inserting a second processing unit into the second socket of the joystick.

Aspect 23: The method of aspect 21 or aspect 22, further comprising using the joystick to effect movement of a piece of equipment electrically coupled to the controller of the first processing unit.

Aspect 24: The method of aspect 23, further comprising:
removing the first processing unit from the first socket; and
inserting a second processing unit into the first socket.

Aspect 25: The method of aspect any one of aspects 21-24, further comprising using the joystick to operate a piece of equipment electrically coupled to the first processing unit.

Aspect 26: A method of replacing a first processing unit in a joystick of any one of aspects 1-18, the method comprising:

removing the first processing unit from the first socket; and inserting a second processing unit into the first socket.

Aspect 27: A kit comprising:
a joystick comprising:
a body defining a handle;
at least a first socket operably coupled to the handle; and
at least one sensor comprising:
at least one orientation sensor that is configured to sense orientation of the handle; or
at least input device;
wherein each sensor of at least one sensor is operably coupled to the at least one socket; and
a plurality of processing units that are configured to electrically couple to the at least one socket, wherein each processing unit of the plurality of processing units comprises:
a controller comprising:
a processor; and
a communications module;
a fitting that is receivable into the first socket,
wherein, upon connection of receipt of each processing unit into the first socket, the processor of the said processing unit is in electrical communication with each sensor of the plurality of sensors.

Although the foregoing invention has been described in some detail by way of illustration and example for purposes of clarity of understanding, certain changes and modifications may be practiced within the scope of the appended claims.

What is claimed is:

1. A system comprising:
a joystick comprising:
a body defining a handle;
a first socket operably coupled to the handle; and
a plurality of sensors comprising:
at least one orientation sensor that is configured to sense an orientation of the handle; or
at least one input device;
wherein each sensor of the plurality of sensors is operably coupled to the first socket so that the first socket provides electrical communication between each sensor of the plurality of sensors and a first processing unit when received within the first socket, and
wherein the plurality of sensors include every sensor of the joystick.

2. The system of claim 1, further comprising the first processing unit configured to be electrically coupled to, and removable from, the first socket, wherein the processing unit comprises:
a controller comprising:
a processor; and
a communications module;
a fitting that is receivable into the first socket,
wherein, upon operable connection of the fitting into the first socket, the processor of the first processing unit is in electrical communication with each sensor of the plurality of sensors.

3. The system of claim 2, wherein the fitting comprises a plurality of pins that are receivable into the socket.

4. The system of claim 3, wherein the plurality of pins are arranged according to ISO 280 specifications.

5. The system of claim 3, wherein the plurality of pins comprise twelve pins arranged in a three rows and four columns.

6. The system of claim 2, wherein the joystick is elongated along a longitudinal axis, and wherein the processing unit is receivable into the socket along the longitudinal axis.

7. The system of claim 2, wherein the controller is in electrical communication with a display.

8. The system of claim 1, wherein the joystick is free of a processor.

9. The system of claim 1, wherein the handle defines an interior space, wherein the at least one socket is positioned within the interior space.

10. The system of claim 1, wherein the joystick is elongated along a longitudinal axis, and wherein the handle comprises two oppositely facing sections that extend along respective axes that are parallel to the longitudinal axis.

11. The system of claim 1, wherein the joystick further comprises a base coupled to the handle, wherein the at least one sensor comprises the at least one orientation sensor configured to sense orientation of the handle comprises, wherein the at least one orientation sensor configured to sense orientation of the handle comprises:
a first orientation sensor that is configured to sense a first angular position of the handle relative to the base in a first plane; and
a second orientation sensor that is configured to sense a second angular position of the handle relative to the base in a second plane that is perpendicular to the first plane.

12. The system of claim 1, wherein the joystick is operably coupled to a piece of equipment.

13. The system of claim 12, wherein the piece of equipment is one of: an on-highway vehicle, a sanitation vehicle, a marine vehicle, maintenance equipment, construction equipment, forestry equipment, or industrial manufacturing equipment.

14. The system of claim 1, wherein the at least one sensor comprises the at least one input device, wherein the at least one input device of the joystick comprises at least one momentary button, at least one micro joystick, at least one thumbwheel, at least one slide switch, at least one toggle switch, at least one potentiometer, at least one hall-effect input, or at least one inductive sensor.

15. The system of claim 1, wherein the joystick further comprises at least one visual indicator or at least one lighting device.

16. The system of claim 1, wherein the first socket is slidably removable from the body of the handle.

17. The system of claim 16, wherein the body of the handle defines at least one slot, wherein the socket comprises at least one outwardly extending protrusion, wherein the at least one slot is configured to receive a respective outwardly extending protrusion of the at least one outwardly extending protrusion.

18. A vehicle comprising:
a joystick comprising:
a body defining a handle;
at least one socket operably coupled to the handle, the at least one socket comprising a first socket; and
at least one sensor comprising:
at least one orientation sensor that is configured to sense an orientation of the handle; or
at least one input device;
wherein each sensor of the at least one sensor is operably coupled to the at least one socket;
a first processing unit, wherein the first processing unit comprises:
a controller comprising:
a processor; and a communications module;
a single fitting that is received into the first socket,
wherein, by operable connection of the fitting into the first socket, the processor of the first processing unit is in electrical communication with each sensor of the at least one sensor; and
a steering mechanism, a power train, or an auxiliary function device;
wherein at least one of the steering mechanism, the power train, or the auxiliary function device is in communication with the controller of the first processing unit such that movement of the joystick or operation of the at least one input device effects movement of a position of the vehicle or operation of the auxiliary function device of the vehicle.

19. A joystick comprising:
a body defining a handle;
a plurality of sockets operably coupled to the handle; and
a plurality of sensors comprising:
at least one orientation sensor that is configured to sense orientation of the handle; or
at least one input device;
wherein each sensor of the plurality of sensors is operably coupled to the at least one socket; and
a plurality of processing units, wherein each processing unit of the plurality of processing units is received within a respective socket of the plurality of sockets, wherein each processing unit of the plurality of processing units comprises:
a controller comprising:
a processor; and
a communications module;
a fitting that is receivable into the respective socket,
wherein the processor of the said processing unit is in electrical communication with at least one respective sensor of the plurality of sensors.

* * * * *